(12) United States Patent
Serin

(10) Patent No.: US 12,078,569 B2
(45) Date of Patent: Sep. 3, 2024

(54) SYSTEM AND METHOD PROVIDING BACK PRESSURE VALUE IN PIPE PLUGS

(71) Applicant: ARGESIM MAKINA GIDA SANAYI TIC.LTD.STI., Çorum (TR)

(72) Inventor: Ilhan Bora Serin, Çorum (TR)

( * ) Notice: Subject to any disclaimer, the term of this patent is extended or adjusted under 35 U.S.C. 154(b) by 108 days.

(21) Appl. No.: 17/619,945

(22) PCT Filed: Oct. 1, 2020

(86) PCT No.: PCT/TR2020/050904
§ 371 (c)(1),
(2) Date: Dec. 16, 2021

(87) PCT Pub. No.: WO2021/225541
PCT Pub. Date: Nov. 11, 2021

(65) Prior Publication Data
US 2022/0299394 A1   Sep. 22, 2022

(30) Foreign Application Priority Data
May 7, 2020   (TR) .................................. 2020/07122

(51) Int. Cl.
*G01M 3/02* (2006.01)
*F16L 55/134* (2006.01)
*G01N 13/02* (2006.01)

(52) U.S. Cl.
CPC ........... *G01M 3/022* (2013.01); *F16L 55/134* (2013.01); *G01N 13/02* (2013.01)

(58) Field of Classification Search
None
See application file for complete search history.

(56) References Cited

U.S. PATENT DOCUMENTS

| 3,726,319 | A | * | 4/1973 | Patterson | F16L 55/134 |
| | | | | | 138/93 |
| 10,739,225 | B1 | * | 8/2020 | Francis | G01M 3/2815 |
| 2008/0105319 | A1 | * | 5/2008 | Aniban | A01M 21/043 |
| | | | | | 137/899.4 |
| 2020/0003352 | A1 | * | 1/2020 | Lundman | F16K 7/10 |
| 2022/0403970 | A1 | * | 12/2022 | Barnstable | F16L 55/134 |

FOREIGN PATENT DOCUMENTS

| EP | 3569914 | A1 | 11/2019 |
| GB | 2536019 | A | 9/2016 |
| RU | 2240467 | C1 | 11/2004 |
| TR | 2015/03939 | B | 4/2015 |

OTHER PUBLICATIONS

International Search Report for corresponding PCT/TR2020/050904 dated May 5, 2021.
Written Opinion of the International Searching Authority for PCT/TR2020/050904, dated May 5, 2021.

* cited by examiner

*Primary Examiner* — Patrick Assouad
*Assistant Examiner* — Mark A Shabman
(74) *Attorney, Agent, or Firm* — Egbert, McDaniel & Swartz, PLLC

(57) ABSTRACT

Disclosed are a system and method in which the maximum back pressure determination and monitoring are provided in plugs allowing fluid and gas flow to be blocked in pipe lines with gravity flow such as sewage and rain water pipe lines.

6 Claims, 4 Drawing Sheets

SYSTEM AND METHOD PROVIDING BACK PRESSURE VALUE IN PIPE PLUGS

TECHNICAL FIELD

The invention relates to inflatable rubber plugs that allow liquid or gas flow to be blocked in gravity lines.

In particular, the invention relates to the system and method in which back pressure calculation/determination/evaluation and notification are provided for the plugs that allow the flow to be blocked in pipe lines having gravity flow such as sewage and rain water.

The State of the Art

Today, the plugs are used in low pressure sloped lines such as in rainwater and sewer pipes. Since there is no valve in the mentioned lines, the only way to block the flow is to use a-plug that is made of rubber material. The plugs are inflated with air and swell like balloons, and thus blocking the flow by completely covering the inside of the pipe. The inflation pressure of the inflated plugs ranges from 0.5 bar to 20 bar. There is always a risk of explosion in the cases of inflation of the currently used plugs, and therefore this is very dangerous. In the case the compressed air explodes, financial losses and also industrial accidents that can result in injuries or even death may occur.

When the plugs used in the present art block the flow in the line, the fluid accumulates back and applies pressure to the plug with a thrust from the back. This pressure is called Back Pressure. The Pipe Plug withstands the thrust caused by the Back Pressure through the friction force between the plug and the pipe. Plugs with large diameters need to withstand loads of tens of tons. In this case, if the friction force is smaller than the force formed by the back pressure that the plug is exposed to from the back, the plug slips into the pipe and after a while it explodes with this sliding effect. This situation leads to financial losses. In case there is a person working in the impact area of the plug, serious injury or accidents resulting death may occur.

Today, the plug manufacturers calculate the back pressure according to the friction force of the plug in the dry and clean concrete pipe and inform the users about their products that can hold the back pressure in the amount of pressure previously calculated. However, the plugs are not only used in dry concrete pipe, but also, they are used in active pipelines with flow inside. In the active lines, the inner surface of the pipe is more slippery than the dry concrete pipe. Therefore, the friction coefficient between the pipe and the plug, and thus the friction force, is different. That is, the friction coefficient varies from application to application and each application has its own specific friction coefficient. However, no plug manufacturer in the world has a chance to know this variability. When the user asks "how much back pressure does your product hold in the pipe that I will block", the manufacturer replies "since we do not know the friction coefficient between the pipe and the plug in your application, we cannot say how much back pressure our plug will hold". In this case, how much back pressure the plugs will hold in active pipes, that is, pipes with flow inside, in other words, pipes that are not dry and clean concrete cannot be calculated and known.

As a result of the research on the subject in the literature, the utility model titled "holding the back pressure with the frictions force by its friction force" application number No TR 2015/03939 has been compared. The invention relates to pressurization apparatus with sealing feature that provides pressure test application by attaching to pipes etc. It is not mentioned in said document a system or method that can calculate the back pressure value and the friction coefficient and accordingly warns the user As a result, a development in the technical field has been required due to the above mentioned negativities and the inadequacy of the present solutions about the subject.

OBJECT OF THE INVENTION

The invention is formed by inspiring from the current situations and aims to solve the negativities mentioned above.

The main object of the invention is to present a system and method that determines the friction coefficient between the pipe and the plug, allows the specified friction coefficient values to be entered into the program that calculates the back pressure, and calculates how much back pressure the plug can hold for the application in which the values of the plug are entered.

Another object of the invention is to present a system where the user can learn how much back pressure the plug can hold.

Another object of the invention is to allow the user to observe the level of the back pressure after the plug blocks the line, to inform or warn the user when it reaches the pressure value set from the user side or the calculated back pressure value or when the plug starts to slide within the pipe, thereby allowing the user to take the necessary precautions and avoiding the plug to slide within the pipe and possible explosions related to this. Thus, injuries and fatal accidents are prevented.

To achieve the objects mentioned above, the invention is a system providing back pressure value, showing the users how much back pressure the plug, that blocks the fluid and gas flow in the pipe lines, can hold in a gravity flow such as sewage and rain water, and preventing the plugs from sliding through the pipe and explosion related to this, for any pipe they use, wherein comprising:

- friction coefficient determining system that determines the friction coefficient between the plug and the pipe to be blocked,
- force measuring apparatus in the friction coefficient determining system, allowing the plug in contact with the pipe to be drawn through the pipe,
- a dynamometer showing how much force the plug is pulled in the pipe as mentioned,
- a program in which the values read in the dynamometer are entered, calculating the back pressure value that the plug can hold according to the entered value.

The structural and characteristic features of the invention will be understood clearly by way of the drawings below and the detailed description written for the purpose of referring to these drawings and therefore this evaluation must be performed by considering these drawings and detailed description.

DRAWINGS ASSISTING UNDERSTANDING OF THE INVENTION

DESCRIPTION OF PART REFERENCES

Figure 1:
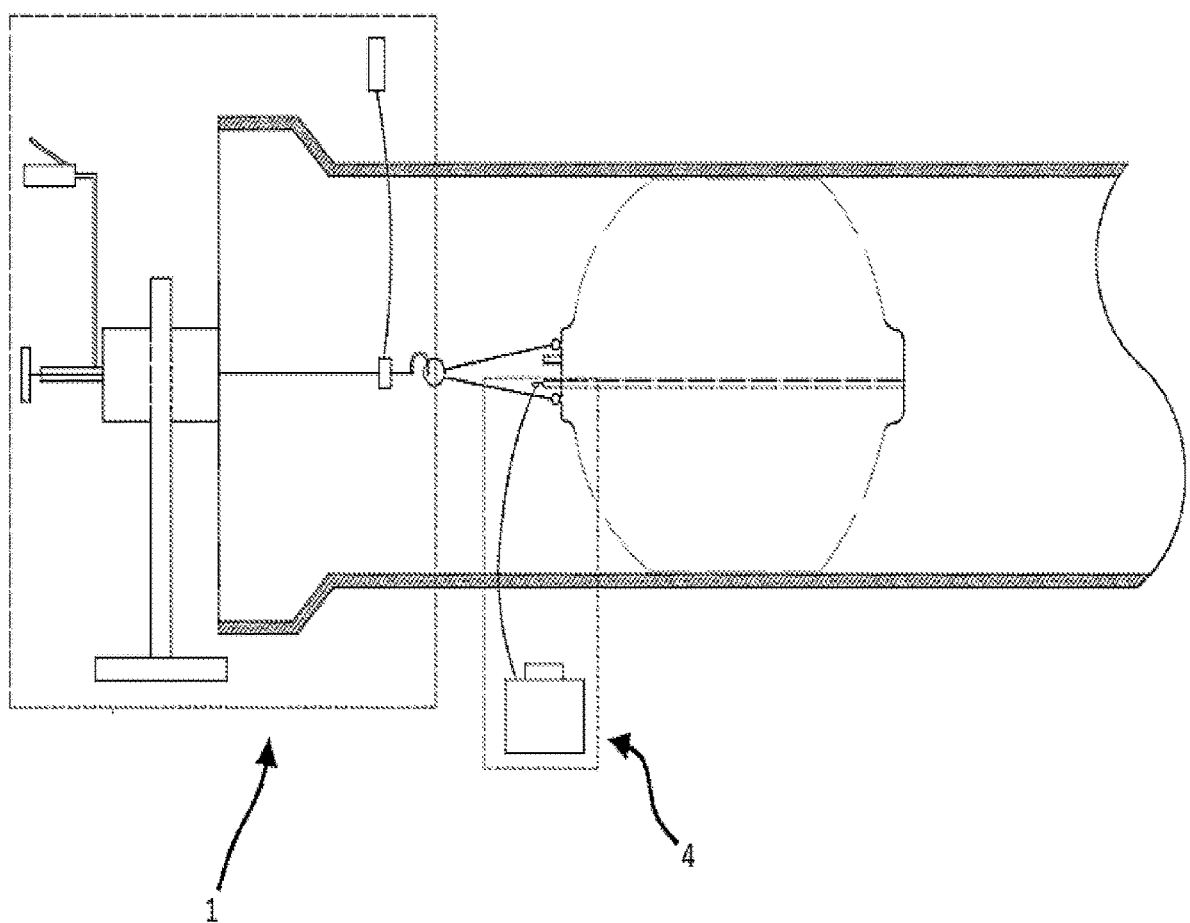
FIG. 1, is a general view of the plug disposed in the pipe and integrated with the friction coefficient determination, information and warning system.
Figure 2:
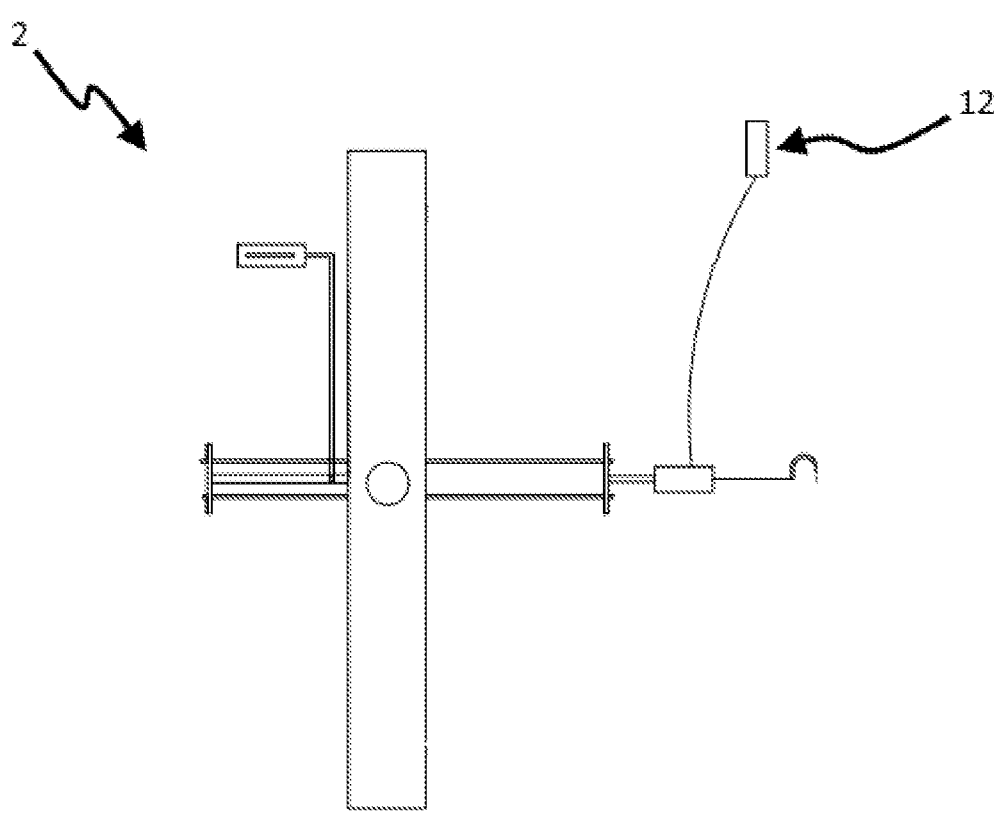
FIG. 2, is a general view of force measuring mechanism.
Figure 3:
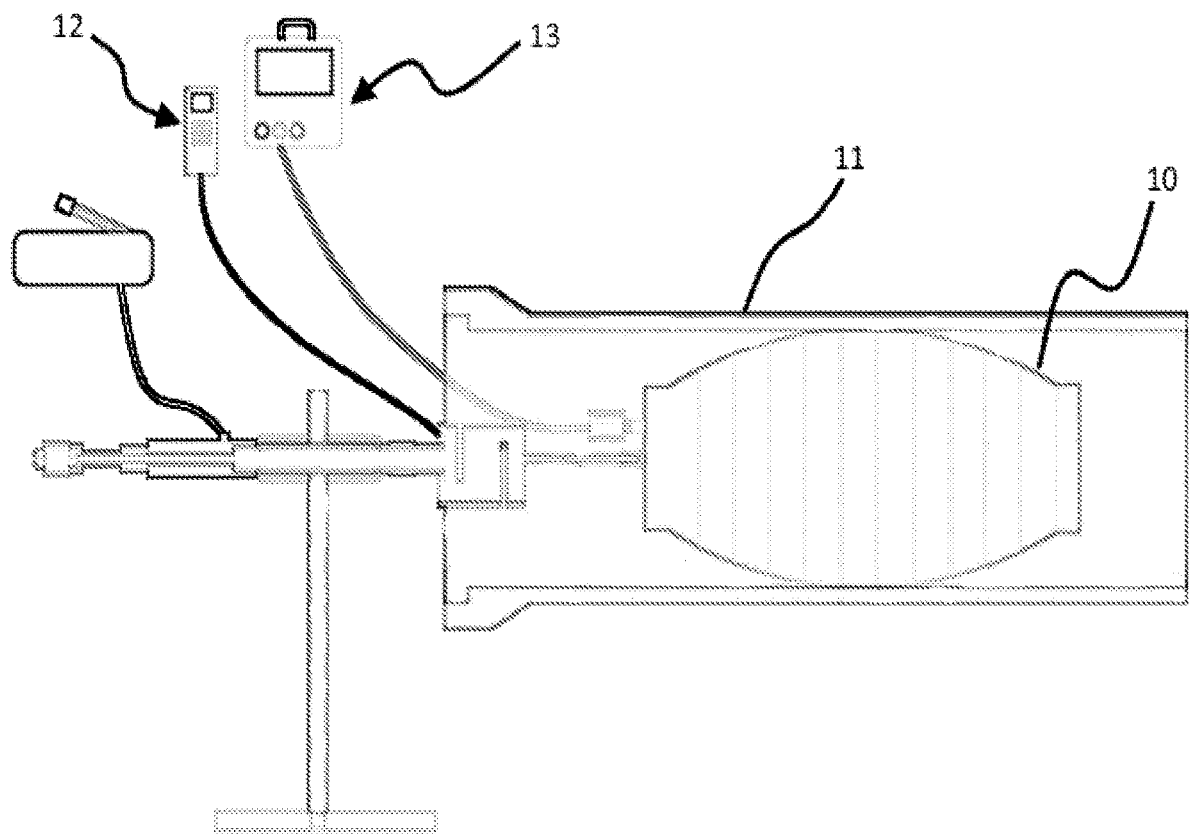
FIG. 3, is a general view of the invention, the system providing the back pressure.

1. Friction coefficient determining system
2. Force measuring mechanism
3. Back pressure calculating program
4. Back pressure notification and warning system
10. Plug
11. Pipe
12. Dynamometer
13. Sensor

DETAILED DESCRIPTION OF THE INVENTION

In this detailed description, the preferred embodiments of the system and method providing back pressure value for the plugs of the invention are described only for a better understanding of the subject.

The invented system providing back pressure value for plugs comprises;
friction coefficient determining system (1) identifying the friction force between the plug (10) and the pipe (11) to be blocked by the plug,
force measuring mechanism (2) located in the friction coefficient determining system (1) and allowing the plug (10) in contact with the pipe to be withdrawn through the pipe (11),
Back pressure calculating program (3) in which the values read in the dynamometer (12) are entered, calculates the pressure value that the plug (10) can hold according to the entered values, and
back pressure notification systems (4) digitally reading the back pressure (pressure behind the plug) held by the plug (10) and informing the user by conveying the back pressure value and warning the user at the moment when the plug (10) starts to slide within the pipe (11) or at a pressure value set by the user.

The plugs (10) are generally used in flow exist pipelines. Therefore, the friction coefficient between the pipe (11) and the plug (10), and thus the friction force, is different for each pipeline application. That is, the friction coefficient varies from application to application. Each application has its own specific friction coefficient. If the friction coefficient between the pipe and the rubber plug in each application is known, how much back pressure it can hold in the pipe where the plug is used can be calculated. By this system and method, first the friction coefficient between the pipe and the plug will be determined, and then the obtained value will be entered into a program and how much back pressure the plug (10) holds for the pipe line application in which the values are entered will be learnt. Also, the user will be warned if the back pressure approaches the maximum level when the application is carried out.

It is important to determine the friction coefficient in the system of the invention. The friction coefficient determining system (1) is processed as follows. The user inflates the received plug (10) in the pipe at low pressure with the minimum contact surface. The force measuring device (2) will pull the plug by applying force. The force that moves the plug will be read from the dynamometer (12) in the system. The pulling force will increase in the dynamometer, and then it will decrease when the plug moves, that is, when it slides within the pipe. The maximum value it reached will be equal to the pulling force that moves the plug, and the pulling force will be equal to the friction force. In this case, since we know the friction force, contact area and inflation pressure, we can calculate the friction coefficient. When we calculate the friction coefficient, we can calculate how much back pressure the plug can hold when full operating pressure is applied.

Figure 4:
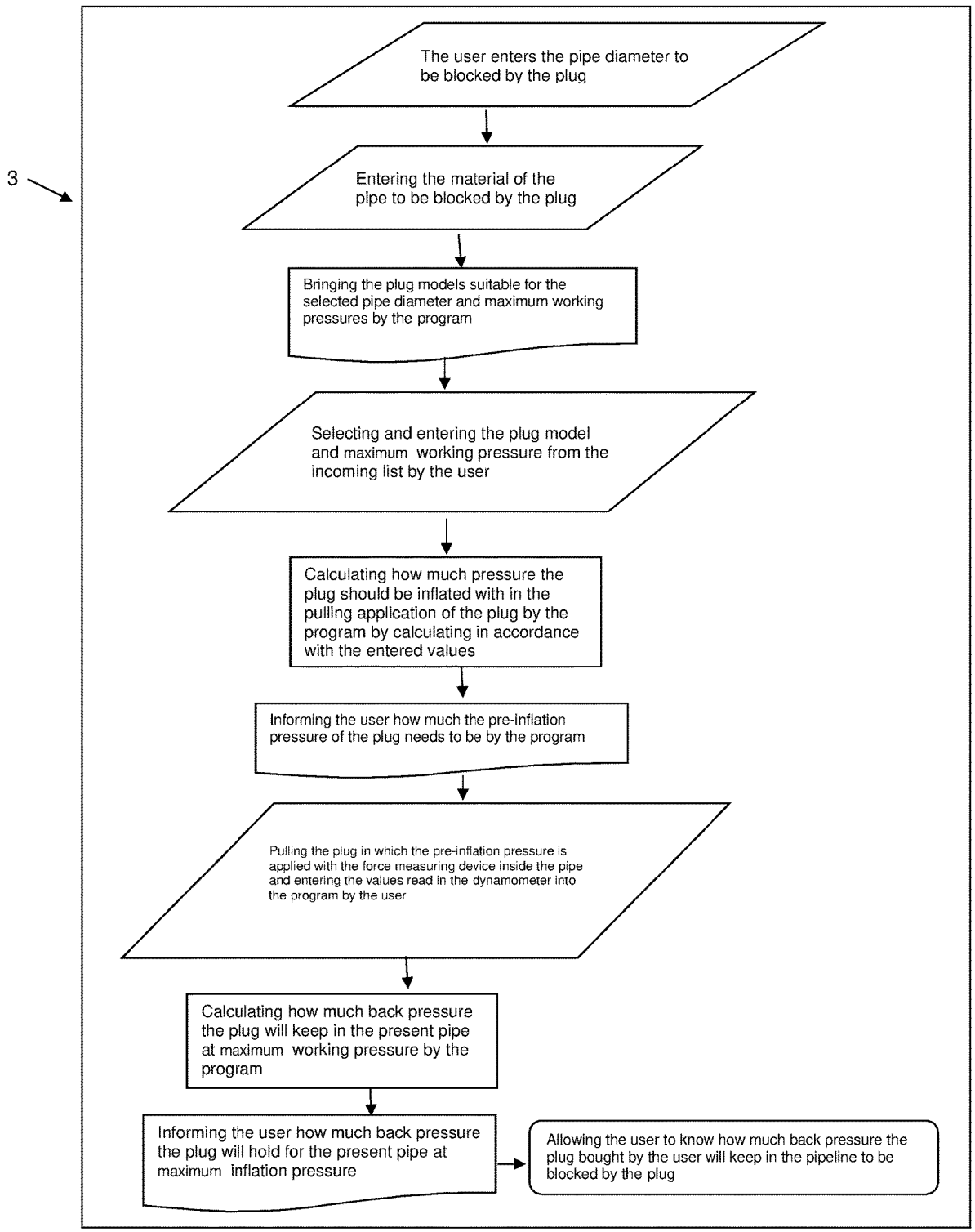
FIG. 4, is a flow chart of the program calculating the back pressure.

A force value is read on the dynamometer (12) by means of the force measuring device (2) in the system (1) that determines the friction coefficient; however, it is difficult to calculate how much back pressure the plug will hold at this value without a calculation program. Therefore, it is necessary to form a calculation program that will help the user. By entering information of the force read on the dynamometer (12) in the force measuring device (2), inflation pressure, plug model and pipe diameter into the back pressure calculating program (3), how much maximum back pressure the plug will hold in the full operating pressure will be known (FIG. 4).

When using the product, the end user will learn how much back pressure the plug can hold in its pipeline by means of the foregoing system; however, there may be no chance to control this pressure. The pressure in the pipe may increase for any reason. In this case, a dangerous situation occurs. If the user can find out that the danger is approaching in advance, she/he can immediately evacuate the working area, take the necessary precautions and prevent injuries or deaths. By interfering immediately, the user can take measures to reduce the back pressure and prevent material losses. The system of the invention is also used to monitor the inflation pressure of the plug and warn the user with the back pressure notification and warning system (4).

For this purpose, there is a sensor (13) in the end of the bypass line, which is connected from the front to the back of the plug through its bypass pipe. This sensor (13) reports the value it reads to an HMI PLC and warns users if the reported value is above the back pressure value set in the control device. Since the back pressure value will be different for each application, the user must enter and set the back pressure value obtained from the back pressure calculating program (3) for each application to the back pressure notification and warning system (4).

Our system of the invention warns the user immediately when the plug starts to slide or reaches the set value mentioned above by the user. This system is as follows: since the plug is placed in the pipe where there is flow or to be tested, the water height at the back of the plug will continuously increase as the water will continuously accumulate behind the plug. Therefore, the back pressure will increase. This pressure increase can be observed from the PLC in the system. However, the back pressure will start to slide when it overcomes the friction force between the plug (10) and the pipe (11). Although this slide is very small, it will cause a decrease in the volume behind the plug and the water height will decrease. That is, the back pressure will decrease. When the sliding is over, the pressure will start increasing again and according to this pressure increase-decrease-increase, it should be understood that the plug has slid. This pressure increase and decrease are also followed from the PCL screen. That is to say, while the back pressure increases continuously, when it decreases suddenly and then starts increasing again, it means the plug has slid. This system is defined to PLC and when there is a situation as we have stated in the application, the device will notify the user and inform that the plug is sliding.

The system of the invention is a method that allows to know how much back pressure the plug can hold for any pipe line to be applied for the plugs (10) that will block the liquid or gas flow in gravity pipe lines such as sewage, rain water, and comprises the following process steps;

entering the pipe (11) and plug (10) information to be used into the back pressure calculating program (3), inflating the plug (10) at a pressure such that the plug is in contact with the pipe (11), attaching the force measuring device (2) located in the friction coefficient determining system (1) to the inflated plug (10), repeating the pulling of the plug several times by applying force, writing values read in the dynamometer (12), entering the values read in the dynamometer into the back pressure calculating program, calculating the maximum back pressure value that the plug can hold for the pipeline application whose values are entered in the program when the plug is inflated with the maximum working pressure by processing all of the data of the back pressure calculating program (3), and entering the back pressure value that the plug (10) can hold (calculated) into the back pressure notification and warning system (4) to warn the end user.

The invention claimed is:

1. A system for determining an amount of back pressure a plug can hold in a pipe, the plug blocking a fluid flow or gas flow in the pipe in which a friction coefficient between the plug and the pipe is not known, the system comprising:

a means for determining the friction coefficient between the plug and the pipe;

a means for measuring a force in said means for determining the friction and for allowing the plug to be pulled through the pipe, said means for measuring the force comprising a dynamometer; and a back pressure calculating program cooperative with said means for determining the friction coefficient and with the dynamometer in which values read by the dynamometer are entered so as to calculate a maximum back pressure value that the plug can hold according to the entered values.

2. The system of claim 1, further comprising:

a back pressure notification and warning means for digitally reading the back pressure and for informing a user by sending a value of the back pressure and for warning the user of a moment when the plug begins to slide in the pipe.

3. The system of claim 1, further comprising:

a back pressure notification and warning means for digitally reading the back pressure and for informing a user by sending a value of the back pressure and for warning the user at a pressure value set by the user.

4. The system of claim 1, further comprising:

a sensor that monitors the pressure of the plug that activates said back pressure notification and warning means when the pressure value reaches a value of the back pressure.

5. A method for determining an amount of back pressure a plug can hold in a pipe, the plug blocking a fluid flow or gas flow in the pipe in which a friction coefficient between the plug and the pipe is not known, the method comprising:

entering information pertaining to the pipe and the plug into a back pressure calculating program;

inflating the plug such that the plug contacts the pipe;

attaching a dynamometer to the inflated plug;

repeating a pulling of the plug several times by applying force to the plug and creating values by the dynamometer;

entering the created values read by the dynamometer into the back pressure calculating program; and calculating a maximum back pressure value that the plug can hold in the pipe by processing data in the back pressure calculating program, the back pressure calculating program receiving values when the plug is inflated with the maximum working pressure.

6. The method of claim 5, further comprising:

entering the maximum back pressure value into a back pressure notification and warning system so as to warn an end user.

\* \* \* \* \*